(12) United States Patent
O'Connor et al.

(10) Patent No.: US 12,553,560 B2
(45) Date of Patent: Feb. 17, 2026

(54) MIXING VALVE ADAPTER

(71) Applicants: Tim O'Connor, Lewellen, NE (US);
Shawn Stapp, Strasburg, CO (US)

(72) Inventors: Tim O'Connor, Lewellen, NE (US);
Shawn Stapp, Strasburg, CO (US)

( * ) Notice: Subject to any disclaimer, the term of this patent is extended or adjusted under 35 U.S.C. 154(b) by 26 days.

(21) Appl. No.: 18/648,559

(22) Filed: Apr. 29, 2024

(65) Prior Publication Data

US 2024/0279914 A1   Aug. 22, 2024

Related U.S. Application Data

(63) Continuation-in-part of application No. 17/809,186, filed on Jun. 27, 2022, now abandoned.

(60) Provisional application No. 63/202,918, filed on Jun. 30, 2021.

(51) Int. Cl.
*F16L 41/03* (2006.01)
*E03C 1/04* (2006.01)
*F16K 11/00* (2006.01)

(52) U.S. Cl.
CPC ............ *F16L 41/03* (2013.01); *E03C 1/0403* (2013.01); *F16K 19/006* (2013.01)

(58) Field of Classification Search
CPC .......... F16L 41/03; E03C 1/0403; E03C 1/04; F16K 19/006
See application file for complete search history.

(56) References Cited

U.S. PATENT DOCUMENTS

| | | | |
|---|---|---|---|
| 1,483,663 A | 2/1924 | Johnson | |
| 1,647,643 A | 11/1927 | Lehnert | |
| 2,295,888 A | 9/1942 | Bucknell et al. | |
| 2,628,799 A | 2/1953 | Aaby | |
| 3,078,476 A | * 2/1963 | Doty et al. | ............ E03C 1/0403 285/125.1 |
| 3,916,947 A | 11/1975 | Flolmes | |
| 4,026,320 A | 5/1977 | Grahl | |
| 6,213,243 B1 | 4/2001 | Studebaker | |
| 7,392,955 B1 | 7/2008 | Laing | |
| 8,522,814 B2 | 9/2013 | Kempf et al. | |
| 2003/0116961 A1 | 6/2003 | Patterson | |
| 2013/0174926 A1 | 7/2013 | Derakhshan | |

(Continued)

FOREIGN PATENT DOCUMENTS

GB            2239068 A        6/1991

OTHER PUBLICATIONS

Sharkbite 3 Port Manifold Closed 25553LF, printed from the Internet on May 18, 2021.

(Continued)

*Primary Examiner* — David Bochna
(74) *Attorney, Agent, or Firm* — Trenner Law Firm, LLC; Mark Trenner

(57) ABSTRACT

A mixing valve adapter is disclosed to connect water lines from a mixing valve to a sink faucet. An example of the mixing valve adapter includes an adapter body for connection between the mixing valve and the sink faucet. Valve connections of the adapter body connect to the respective water source connections and the mixing valve. Faucet connections on the adapter body connect to the sink faucet. The faucet connections have reinforcement structures. One of the valve connections also has a reinforcement structure. Connection housings connect the faucet connections to the sink faucet.

18 Claims, 7 Drawing Sheets

(56) References Cited

U.S. PATENT DOCUMENTS

| | | |
|---|---|---|
| 2014/0261848 A1 | 9/2014 | Roden |
| 2020/0041059 A1* | 2/2020 | Genoni .................. F16L 41/03 |
| 2021/0340743 A1 | 11/2021 | Zhang |
| 2023/0003325 A1 | 1/2023 | Tullius |
| 2023/0003326 A1 | 1/2023 | O'Connor |

OTHER PUBLICATIONS

Watts P 10 Port Quick Connect Manifold, printed from the Internet on May 18, 2021.

* cited by examiner

MIXING VALVE ADAPTER

PRIORITY CLAIM

This application is a continuation-in-part of U.S. patent application Ser. No. 17/809,186 filed Jun. 27, 2022 for "Mixing Valve Adapter" of O'Connor and Stapp, which claims the priority filing benefit of U.S. Provisional Patent Application No. 63/202,918 filed Jun. 30, 2021 for "Mixing Valve Adapter" of O'Connor and Stapp, each hereby incorporated by reference in its entirety as though fully set forth herein.

BACKGROUND

Lavatory mixing valves are provided under some sinks to mix hot and cold water. Mixing valves may aid to minimize the risk of scalding. Mixing valves may have flow characteristics and check valves to protect against cross flow.

Installing mixing valves with conventional flex lines in the cabinets under sinks can be time consuming. Once installed, the flex links can kink, are messy in appearance, and interfere with the cabinet space under the sink.

DETAILED DESCRIPTION

Figure 1:
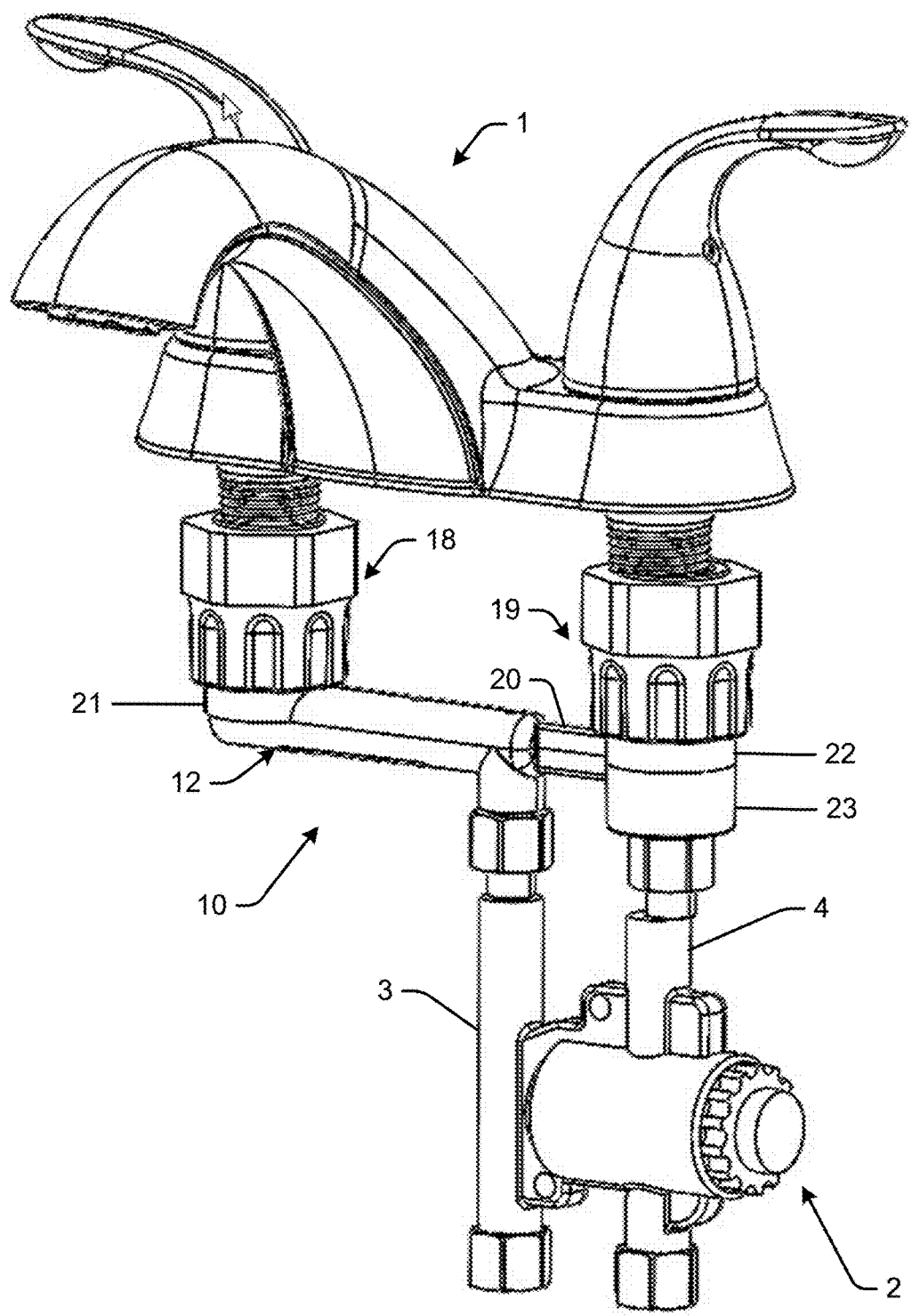
FIG. 1 is an isometric view of the example mixing valve adapter shown as it may be connected to a double inlet sink faucet.

A mixing valve adapter is disclosed for a sink faucet with a mixing valve. The mixing valve adapter may be a unitary (e.g., single or one piece) rigid connection that is compact and easy to install with conventional 4-port mixing valves in the cabinet under sinks.

The mixing valve adapter may be implemented for a sink faucet with a mixing valve, and is installed, typically under the lavatory or kitchen cabinet, in-line between the sink faucet and the mixing valve. That is, the cold and hot water supply lines are attached to the mixing valve. The mixing valve is connected to the mixing valve adapter, and the mixing valve adapter is connected to the sink faucet.

An example mixing valve adapter includes an adapter body to connect between the sink faucet and the mixing valve. The adapter body is formed as a rigid unitary structure that does not flex so that the mixing valve is mounted rigid to the sink faucet without separately mounting the mixing valve apart from the sink faucet.

An example of the mixing valve adapter includes an adapter body for connection between the mixing valve and the sink faucet. Valve connections of the adapter body connect to the respective water source connections of the mixing valve. Faucet connections on the adapter body connect to the sink faucet. The faucet connections have reinforcement structures. One of the valve connections also has a reinforcement structure. Connection housings connect the faucet connections to the sink faucet.

In an example, the mixing valve adapter also includes a bridge formed between the first side of the adapter body, and the second side of the adapter body. The bridge may have a solid cross section (in all orientations, i.e., it is solid) so that the bridge is fluidically independent from the second side of the adapter body. As such, the bridge can be cut to separate the first side of the adapter body from the second side of the adapter body (without opening the water line).

In an example, an end cap is provided for the adapter body. The end cap may be removable for testing or cleaning (e.g., unclogging) the mixing valve adapter.

In an example, the connections may be compression fittings, union fittings, and/or any other suitable connections and/or combination of connections, as will be readily understood by those having ordinary skill in the art after becoming familiar with the teachings herein.

Before continuing, it is noted that as used herein, the terms "includes" and "including" mean, but is not limited to, "includes" or "including" and "includes at least" or "including at least." The term "based on" means "based on" and "based at least in part on."

It is also noted that the examples described herein are provided for purposes of illustration, and are not intended to be limiting. Other devices and/or device configurations may be utilized to carry out the operations described herein.

The operations shown and described herein are provided to illustrate example implementations. It is noted that the operations are not limited to the ordering shown. Still other operations may also be implemented.

FIG. 1 is an isometric view of the example mixing valve adapter 10 shown as it may be connected to a double inlet sink faucet 1. In an example, the mixing valve adapter 10 includes an adapter body 12 to connect between the sink faucet 1 and a mixing valve 2. It is noted that the mixing valve adapter 10 need not be installed with a mixing valve 2. In other examples, the cold and/or hot water supply lines may be connected directly to the mixing valve adapter 10, which is then connected to the sink faucet.

An example mixing valve adapter 10 includes a first valve connection 14 of the adapter body 12 for connecting to a first water source connection (e.g., cold water line 3 and/or a cold outlet from the mixing valve 2), and a second valve connection 15 of the adapter body 12 for connecting to a second water source connection (e.g., the mixed hot-and-cold outlet 4 from the mixing valve 2). The water sources may be cold, and separately, mixed hot-and-cold (e.g., mixed by the mixing valve), as shown in FIG. 1. In FIG. 1, the cold water line 3 is shown bypassing the mixing valve 2 and connecting directly to the first valve connection 14. However, some mixing valves include both a line out for cold and a separate line out for the mixed hot-and-cold water.

The example mixing valve adapter 10 also includes a first faucet connection 16 on the adapter body 12 for connecting to the sink faucet 1, and a second faucet connection 17 on the adapter body 12 for connecting to the sink faucet 1. The example mixing valve adapter 12 includes a first connection housing 18 to connect the first faucet connection 16 to the sink faucet 1, and a second connection housing 19 to connect the second faucet connection 17 to the sink faucet 1.

In an example, the adapter body 12 is rigid and does not flex so that the mixing valve 2 is mounted rigid to the sink faucet 1 without having to separately mount the mixing valve 2 apart from the sink faucet 1 (e.g., to the sink cabinet as may otherwise be required to reduce or prevent vibration).

In an example, the adapter body 12 is formed as a unitary structure. That is, the adapter body 12 is formed in a mold. In an example, the adapter body 12 includes a bridge 20 formed between a first side of the adapter body 12 and a second side of the adapter body 12.

In an example, the bridge 20 is a fixed length (e.g., 4 inches, or 6 inches, or 8 inches). Any suitable length may be provided depending at least to some extent on the intended installation (e.g., separation of the cold and hot water inlets on the sink faucet). In another example, the bridge 20 has an adjustable length (not shown), such that it can be slid or rotated to adjust the length between 4 to 8 inches or other suitable length adjustment for use in different installation settings with different types of sink faucets.

In an example, the bridge 20 may have a solid cross section. That is, the first side of the adapter body 12 is fluidically independent from the second side of the adapter body 12. That is, there is no water flow passage through the bridge 20, as seen for example in the cross-sectional view of FIG. 6.

Figure 2:
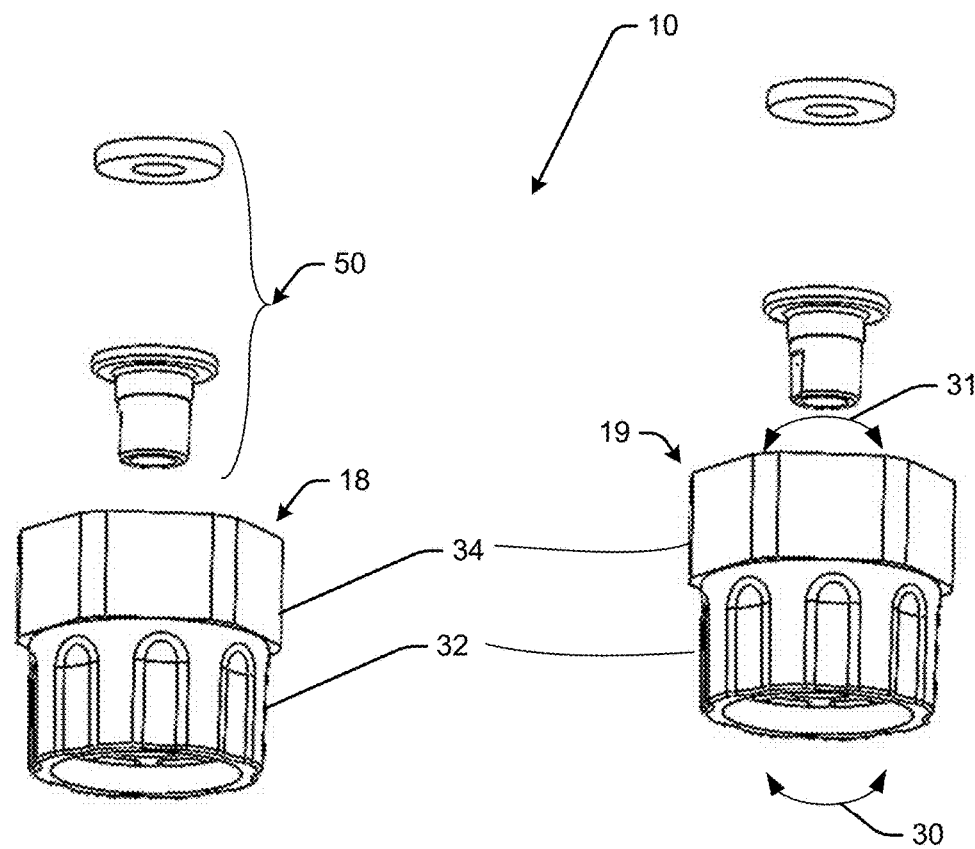
FIGS. 2 and 3 are isometric views of an example mixing valve adapter shown with fittings.
Figure 2:
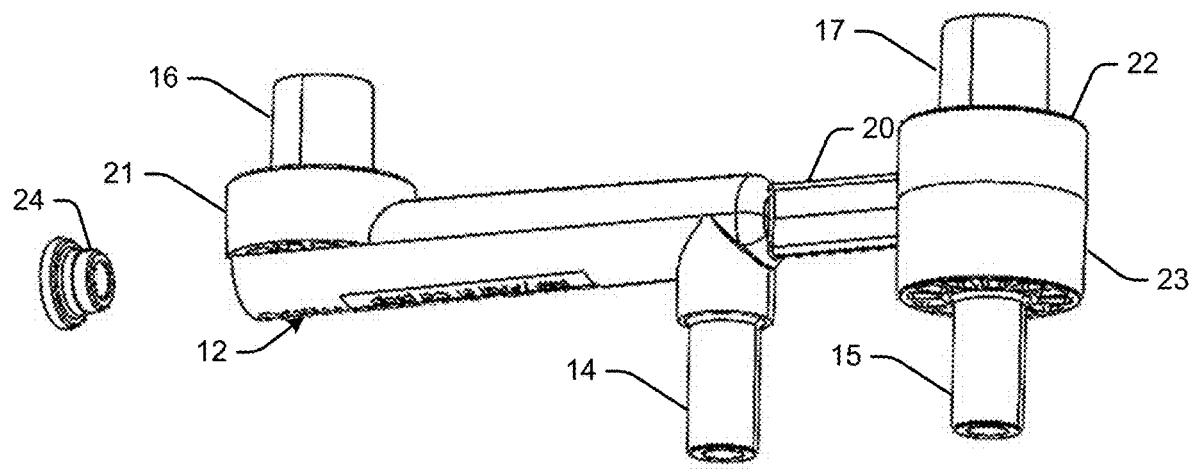
Figure 3:
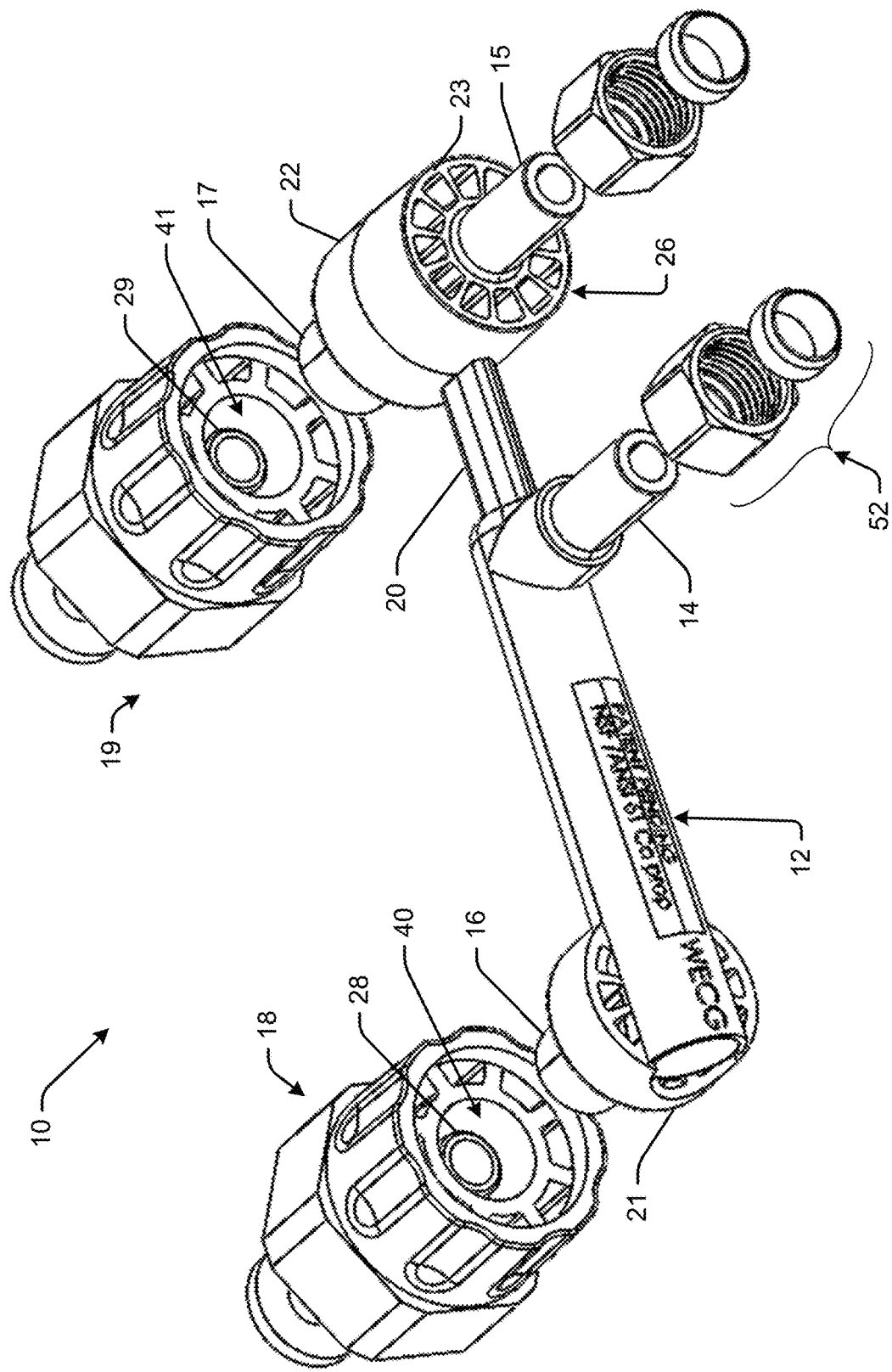
Figure 4:
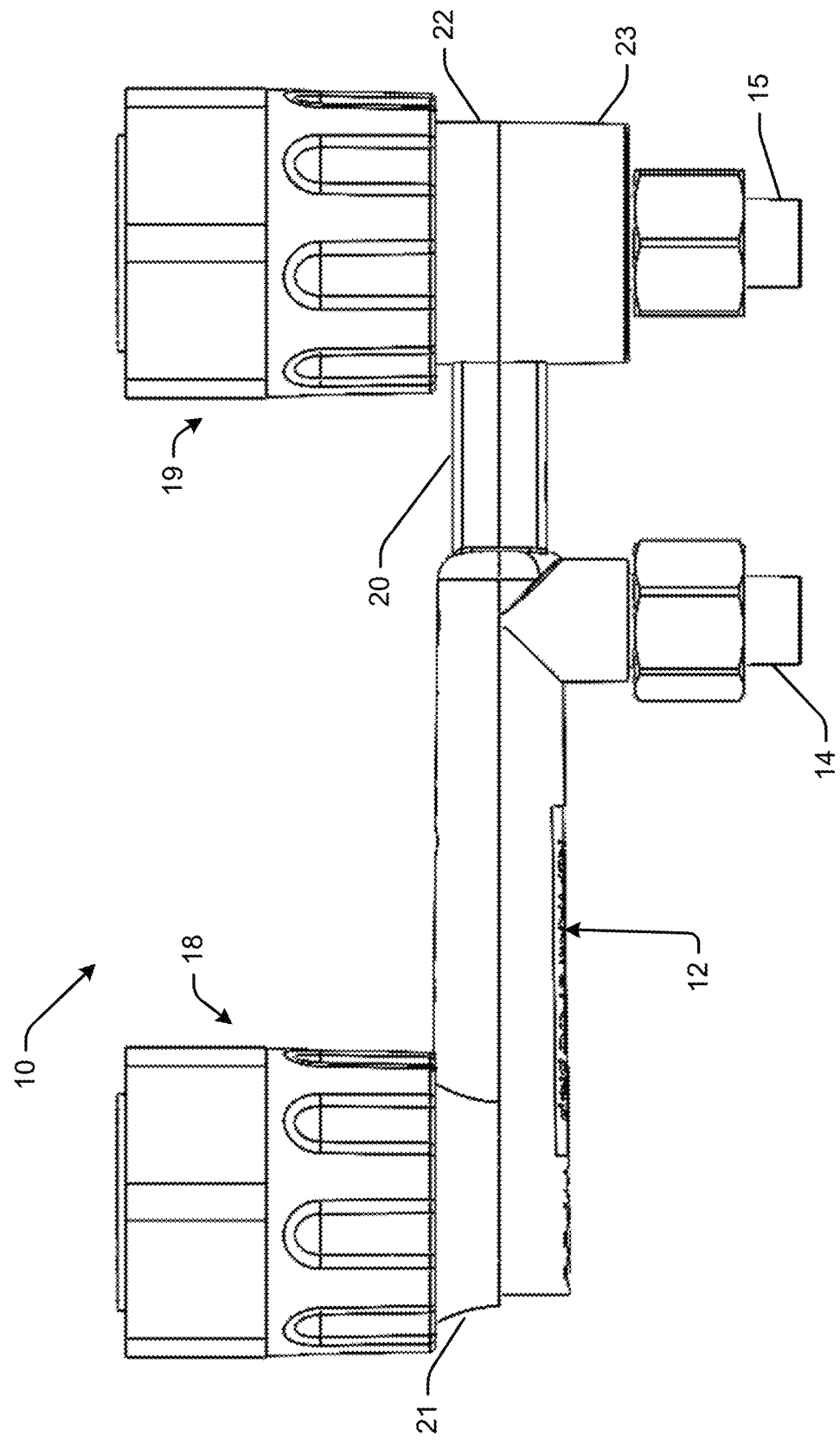
FIG. 4 is a side view of the example mixing valve adapter with fittings shown in FIGS. 2 and 3.
Figure 5:
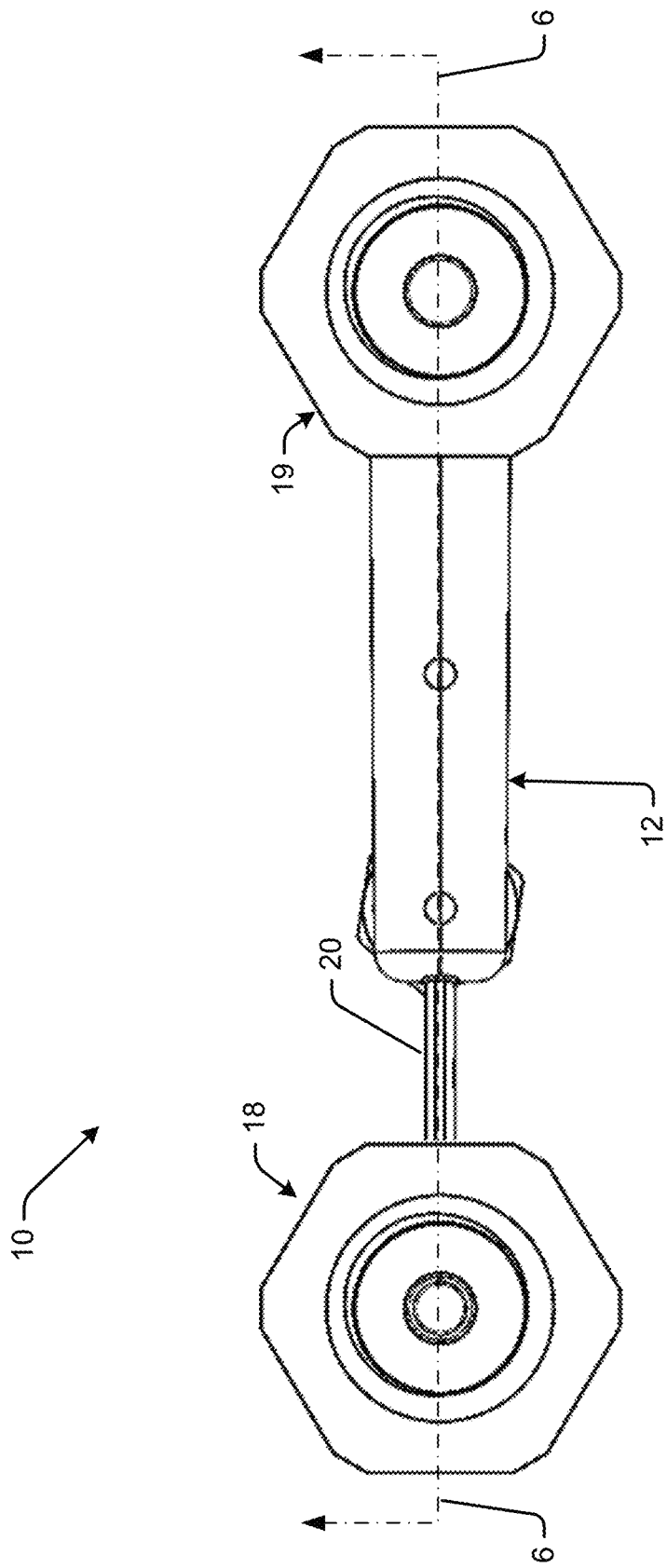
FIG. 5 is a top view of the example mixing valve adapter with fittings shown in FIGS. 2 and 3.

FIGS. 2 and 3 are isometric views of an example mixing valve adapter 10 shown with fittings. FIG. 4 is a side view of the example mixing valve adapter 10 with fittings shown in FIGS. 2 and 3. FIG. 5 is a top view of the example mixing valve adapter 10 with fittings shown in FIGS. 2 and 3.

As already discussed above, the example mixing valve adapter 10 to connect water lines from a mixing valve 2 to a sink faucet 1 includes an adapter body 12 for connection between the mixing valve 2 and the sink faucet 1. A first valve connection 14 of the adapter body 12 is provided for connecting to a first water source connection (e.g., the cold water line 3 or a cold outlet from the mixing valve 2). A second valve connection 15 of the adapter body 12 is provided for connecting to a second water source connection (e.g., the mixed hot-and-cold line out from the mixing valve 2). A first faucet connection 16 on the adapter body 12 is provided for connecting to the sink faucet 1. A second faucet connection 17 on the adapter body 12 is also provided for connecting to the sink faucet 1.

In an example, a first reinforcement structure 21 is provided for the first faucet connection 16. A second reinforcement structure 22 is provided for the second faucet connection 17. A third reinforcement structure 23 is provided for the second valve connection 15.

In an example, a first connection housing 18 is provided to connect the first faucet connection 16 to the sink faucet 1. A second connection housing 19 is provided to connect the second faucet connection 17 to the sink faucet 1.

In an example, the body 12 of the mixing valve adapter 10 may include a removable end cap 24. The end cap 24 may be removable for testing or cleaning (e.g., unclogging) the mixing valve adapter. In another example, the end of the body 12 may be permanently closed (e.g., formed closed during manufacture).

In an example, each of the reinforcement structures 21, 22, and 23 has an internal honeycomb structure 25. For example, each of the reinforcement structures 21, 22, and 23 are shown being generally cylindrical in shape. In an example, each of the reinforcement structures 21, 22, and 23 have about the same outside diameter. For example, the reinforcement structures 21, 22, and 23 have generally cylindrically shaped solid side walls. The reinforcement structures 21, 22, and 23 also have an internal array of hollow cells formed between thin separating walls (see, e.g., FIG. 3). Of course, any suitable support structure may be provided, and is not limited to the hollow-cell-and-wall structure shown in the drawings.

Figure 6:
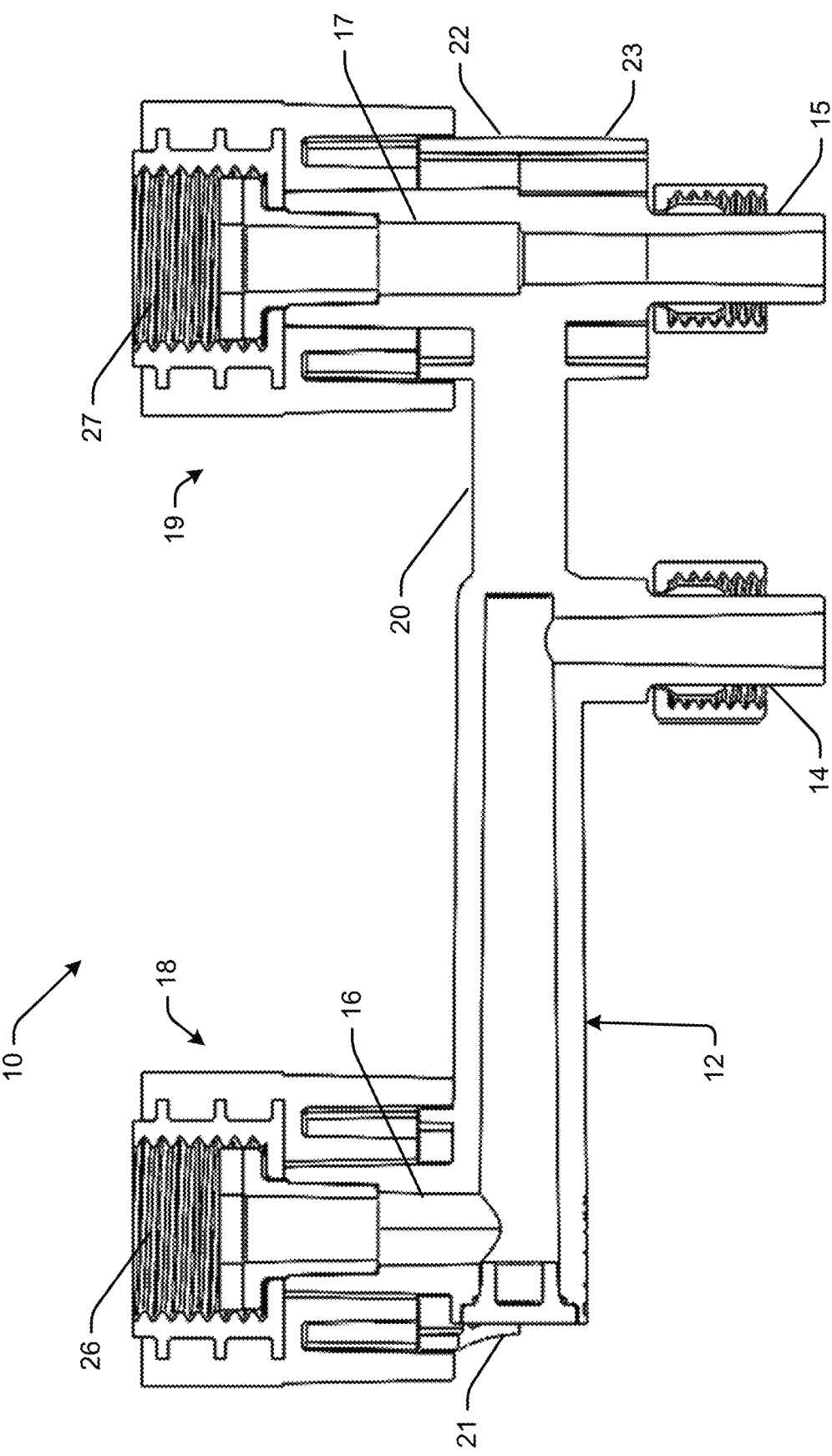
FIG. 6 is a cross-section view of the example mixing valve adapter taken along lines 6-6 in FIG. 5.

As seen in FIG. 6, each of the connection housings 16, 17 are internally threaded 26, 27 on a first end to connect directly to the sink faucet 1. As seen in FIG. 3, each of the connection housings 16, 17 are also threaded 28, 29 inside cavities 40, 42 formed on a second end to connect directly to the first faucet connection 16 on the adapter body 12. The first and second connection housings 16, 17 also have an internal diameter that is larger than an external diameter of the respective first and second reinforcement structures 21, 22, so that the first and second connection housings 18, 19 fit at least partially over the respective first and second reinforcement structures 21, 22.

In an example, each end of the first and second connection housings 16, 17 are separately rotatable relative to each other (see, e.g., arrows 30, 31 in FIG. 2. That is, the first and second connection housings 16, 17 can be rotated in the same or opposite directions relative to each other to thread one end onto the respective first and second faucet connections 16, 17, and to thread another end onto the sink faucet 1. The first and second connection housings 18, 19 may have both a ridged outer perimeter portion 32 and a hexagonal outer perimeter portion 34. The first and second connection housings 18, 19 may have a ridged outer perimeter for a user to readily grasp by hand and turn the first and second connection housing 18, 19 for connecting onto the respective first and second faucet connections 16, 17. The first and second connection housings 18, 19 may also have a hexagonal outer perimeter 34 for a user to readily grasp by tool such as a wrench, and turn the first and second connection housing 18, 19 for connecting onto the sink faucet 1.

It is understood that the mixing valve adapter 10 may be configured in any suitable manner so as to provide connections via any fittings now known or later developed that are suitable for water lines. For example, the connections (e.g., 50 in FIGS. 2, and 52 in FIG. 3) may be compression fittings, all of the connections may be union fittings, some or all of the connections may be slip fit connections or push-to-connect fittings (e.g., SHARKBITE™). The mixing valve adapter 10 is not limited to the connections shown and described herein except to the extent a particular embodiment may be described by the claims.

Figure 7:
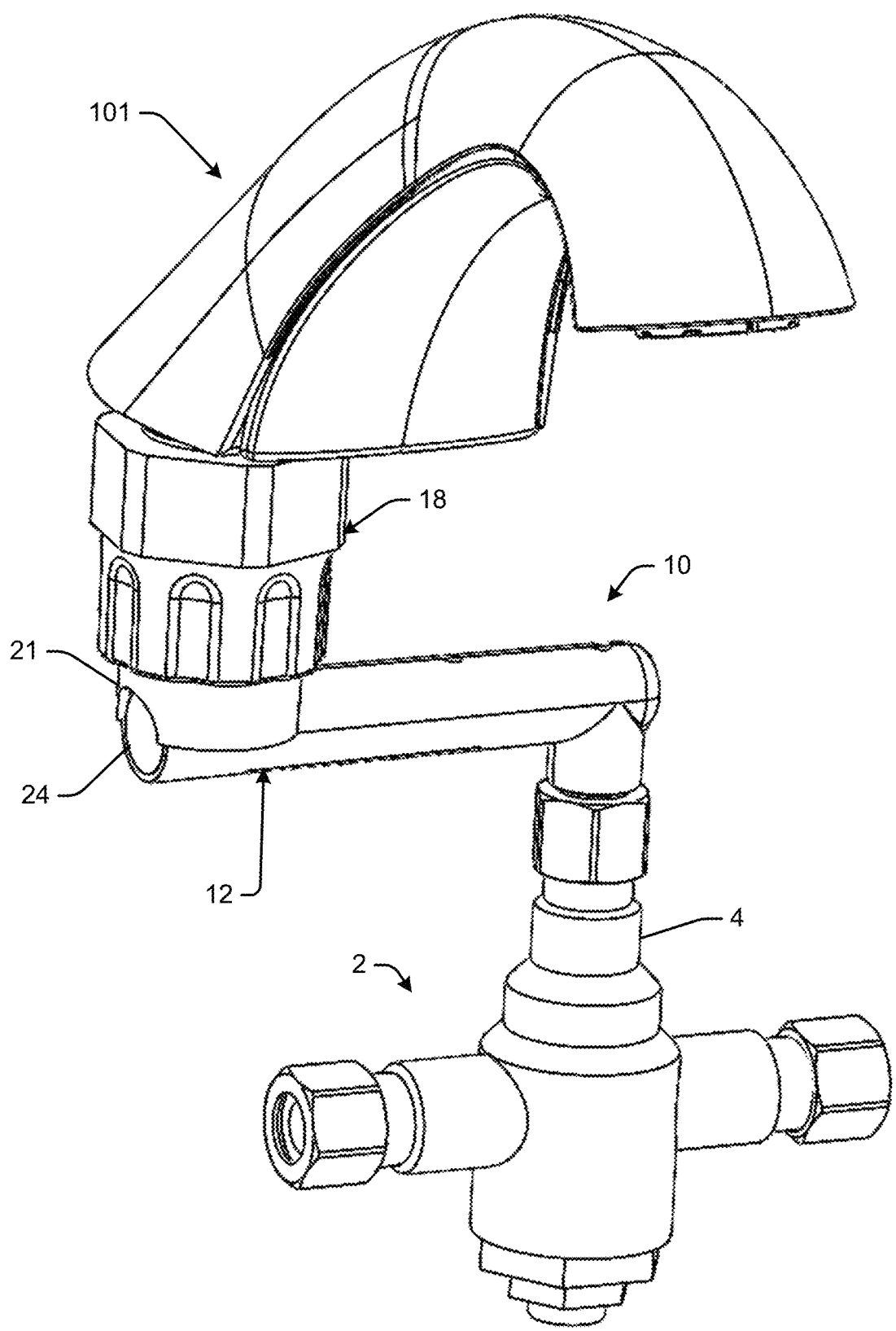
FIG. 7 is a perspective view of the example mixing valve adapter shown as it may be cut and connected to a single inlet sink faucet.

FIG. 6 is a cross-section view of the example mixing valve adapter 10 taken along lines 6-6 in FIG. 5. The first side of the adapter body 12 is fluidically independent from the second side of the adapter body 12. For example, the mixing valve adapter 10 has a solid bridge 20 formed between a first side of the adapter body 12 with the first valve connection 14 and the first faucet connection 16, and a second side of the adapter body 12 with the second valve connection 15 and the second faucet connection 17. In an example, the bridge 20 may be cut to separate the first side of the adapter body 12 from the second side of the adapter body 12. Such a configuration may be implemented when the sink faucet only has a single inlet connection, such as for a sensor faucet. FIG. 7 is a perspective view of the example mixing valve adapter 10 shown after it has been cut and connected to a single inlet sink faucet 101.

It is noted that the examples shown and described are provided for purposes of illustration and are not intended to be limiting. For example, components may be separately molded and assembled to form all or part of the mixing valve adapter described herein, and/or one or more of the components may be molded as a unitary structure. In addition, while the mixing valve adapter has been described as it may be used primarily for the installation of sink faucets with mixing valves, it will be readily apparent to those having ordinary skill in the art after becoming familiar with the teachings herein, that the mixing valve adapter may be modified for use in other applications and is not to be limited to any particular end-use. Still other examples are also contemplated.

The invention claimed is:

1. A mixing valve adapter to connect water lines from a mixing valve to a sink faucet, comprising:
   an adapter body for connection between the mixing valve and the sink faucet;
   a first valve connection of the adapter body for connecting to a first water source connection;
   a second valve connection of the adapter body for connecting to a second water source connection;
   a first faucet connection on the adapter body for connecting to the sink faucet;
   a second faucet connection on the adapter body for connecting to the sink faucet;
   a first reinforcement structure of the first faucet connection;
   a second reinforcement structure of the second faucet connection;
   a third reinforcement structure of the second valve connection;
   a first connection housing to connect the first faucet connection to the sink faucet; and
   a second connection housing to connect the second faucet connection to the sink faucet;
   wherein the first and second connection housings fit at least partially over the respective first and second reinforcement structures.

2. The mixing valve adapter of claim 1, wherein each of the reinforcement structures has an internal structure of hollow cells.

3. The mixing valve adapter of claim 1, wherein each of the reinforcement structures are cylindrical in shape, having solid side walls and an internal array of hollow cells formed between separating walls.

4. The mixing valve adapter of claim 1, wherein each of the reinforcement structures have about the same outside diameter.

5. The mixing valve adapter of claim 1, wherein each of the connection housings are internally threaded on a first end to connect directly to the sink faucet.

6. The mixing valve adapter of claim 5, wherein each of the connection housings are threaded on a second end to connect directly to the first faucet connection on the adapter body.

7. The mixing valve adapter of claim 1, wherein the first and second connection housings have an internal diameter that is larger than an external diameter of the respective first and second reinforcement structures.

8. The mixing valve adapter of claim 1, wherein each end of the first and second connection housings are separately rotatable relative to each other to assemble one end onto the respective first and second faucet connections and to assemble another end onto the sink faucet.

9. The mixing valve adapter of claim 1, wherein the first and second connection housings have both a ridged outer perimeter portion and a hexagonal outer perimeter portion.

10. The mixing valve adapter of claim 1, wherein the first and second connection housings have a ridged outer perimeter for a user to readily grasp by hand and turn the first and second connection housing for connecting onto the respective first and second faucet connections.

11. The mixing valve adapter of claim 1, wherein the first and second connection housings have a hexagonal outer perimeter for a user to readily grasp by tool and turn the first and second connection housing for connecting onto the sink faucet.

12. The mixing valve adapter of claim 1, wherein the first side of the adapter body is fluidically independent from the second side of the adapter body.

13. The mixing valve adapter of claim 1, further comprising a bridge formed between a first side of the adapter body with the first valve connection and the first faucet connection, and a second side of the adapter body with the second valve connection and the second faucet connection.

14. The mixing valve adapter of claim 13, wherein the bridge has a solid cross section.

15. The mixing valve adapter of claim 14, wherein the bridge is cut to separate the first side of the adapter body from the second side of the adapter body.

16. A mixing valve adapter to connect water lines from a mixing valve to a sink faucet, comprising:
   an adapter body for connection between the mixing valve and the sink faucet;
   a first valve connection of the adapter body for connecting to a first cold water source connection;
   a second valve connection of the adapter body for connecting to a second mixed hot-and-cold water source connection of the mixing valve;
   a first faucet connection on the adapter body for connecting to the sink faucet;
   a second faucet connection on the adapter body for connecting to the sink faucet;
   a first reinforcement structure of the first faucet connection;
   a second reinforcement structure of the second faucet connection;
   a third reinforcement structure of the second valve connection;
   a first connection housing to connect the first faucet connection to the sink faucet; and
   a second connection housing to connect the second faucet connection to the sink faucet;
   wherein each of the reinforcement structures have an internal structure of hollow cells.

17. The mixing valve adapter of claim 16, wherein each of the reinforcement structures are cylindrical in shape, having solid side walls and the internal structure of hollow cells is formed between a web of separating walls.

18. A mixing valve adapter to connect water lines from a mixing valve to a sink faucet, comprising:
   an adapter body for connection between the mixing valve and the sink faucet;
   a valve connection of the adapter body for connecting to a water source connection of the mixing valve;
   a first faucet connection on the adapter body for connecting to the sink faucet;
   a second faucet connection on the adapter body for connecting to the sink faucet;
   a first reinforcement structure of the first faucet connection;
   a second reinforcement structure of the second faucet connection;
   a first connection housing to connect the first faucet connection to the sink faucet; and
   a second connection housing to connect the second faucet connection to the sink faucet;
   wherein each of the reinforcement structures are cylindrical in shape with an internal structure of hollow cells having solid side walls and an internal array of hollow cells formed between a web of separating walls.

* * * * *